(12) United States Patent
Son

(10) Patent No.: US 8,568,495 B2
(45) Date of Patent: Oct. 29, 2013

(54) EVAPORATOR AND FUEL REFORMER HAVING THE SAME

(75) Inventor: In-Hyuk Son, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 876 days.

(21) Appl. No.: 12/420,784

(22) Filed: Apr. 8, 2009

(65) Prior Publication Data
US 2010/0058663 A1    Mar. 11, 2010

Related U.S. Application Data

(60) Provisional application No. 61/094,802, filed on Sep. 5, 2008.

(51) Int. Cl.
*B01D 1/00* (2006.01)
(52) U.S. Cl.
USPC .................. 48/127.9; 422/200; 159/28.6
(58) Field of Classification Search
USPC .................... 165/144, 147, 164–167
See application file for complete search history.

(56) References Cited

U.S. PATENT DOCUMENTS

| | | | |
|---|---|---|---|
| 6,159,434 A | 12/2000 | Gonjo et al. | |
| 6,203,771 B1 * | 3/2001 | Lester et al. | 423/219 |
| 6,531,102 B1 | 3/2003 | Nakamura et al. | |
| 2002/0066552 A1 * | 6/2002 | Komoda | 165/170 |
| 2002/0131921 A1 | 9/2002 | Ishikawa | |
| 2002/0168307 A1 | 11/2002 | Seaba et al. | |
| 2003/0049184 A1 | 3/2003 | Kimata et al. | |
| 2003/0215679 A1 | 11/2003 | Reinke et al. | |
| 2006/0060305 A1 | 3/2006 | Klemm et al. | |
| 2007/0071659 A1 | 3/2007 | Gil et al. | |
| 2008/0058434 A1 | 3/2008 | Tonkovich et al. | |
| 2009/0084524 A1 | 4/2009 | Miyazaki | |

FOREIGN PATENT DOCUMENTS

| | | |
|---|---|---|
| CN | 1623077 A | 6/2005 |
| DE | 31 31 642 A1 | 3/1983 |
| EP | 1 498 682 A1 | 1/2005 |
| JP | 60-176371 | 11/1985 |
| JP | 10-236802 | 9/1998 |
| JP | 2000-319002 | 11/2000 |
| JP | 2002-003202 | 1/2002 |
| JP | 2002-168591 | 6/2002 |

(Continued)

OTHER PUBLICATIONS

KIPO Office action dated Aug. 17, 2010, for corresponding Korean Patent application 10-2008-0125753, noting listed references in this IDS, as well as KR 10-2008-0027686, previously filed in an IDS dated Apr. 8, 2009.

(Continued)

*Primary Examiner* — Imran Akram
(74) *Attorney, Agent, or Firm* — Christie, Parker & Hale, LLP

(57) ABSTRACT

An evaporator (e.g., a small-sized high-efficiency evaporator) and a fuel reformer having the same. The evaporator has multi-stage structure (e.g., a four-stage disk structure), in which the respective disks are filled with fin structures. The first two disks through which exhaust gas passes and the second two disks through which water passes are stacked alternately with each other. Also, the first two disks are coupled with each other by a first pipe penetrating through one of the second two disks, and the second two disks are coupled with each other by a second pipe penetrating through one of the first two disks.

27 Claims, 8 Drawing Sheets

(56) References Cited

FOREIGN PATENT DOCUMENTS

| | | |
|---|---|---|
| JP | 2002-276926 | 9/2002 |
| JP | 2003-89502 A | 3/2003 |
| JP | 2004-35309 | 2/2004 |
| JP | 2004-224621 | 8/2004 |
| JP | 2005-505097 | 2/2005 |
| JP | 2005-087803 | 4/2005 |
| JP | 2005-531105 A | 10/2005 |
| JP | 2006-502846 | 1/2006 |
| JP | 2006-327835 | 12/2006 |
| JP | 2007-95699 A | 4/2007 |
| KR | 1993-0022047 | 11/1993 |
| KR | 10-2007-0112418 | 11/2007 |
| KR | 10-2008-0027686 | 3/2008 |
| WO | WO 2008/030467 A2 | 3/2008 |

OTHER PUBLICATIONS

European Search Report dated Feb. 3, 2010, for corresponding European Patent application 09169315.0, noting listed references in this IDS.

Japanese Office action dated Jul. 31, 2012 for JP Patent Application No. 2009-205166 that corresponds to U.S. Appl. No. 61/094,802 and U.S. Appl. No. 12/420,784, 2 pages.

SIPO Patent Gazette dated Dec. 12, 2012, for corresponding Chinese Patent application 200910172032.9, with English translation of p. 1 only, (3 pages).

* cited by examiner

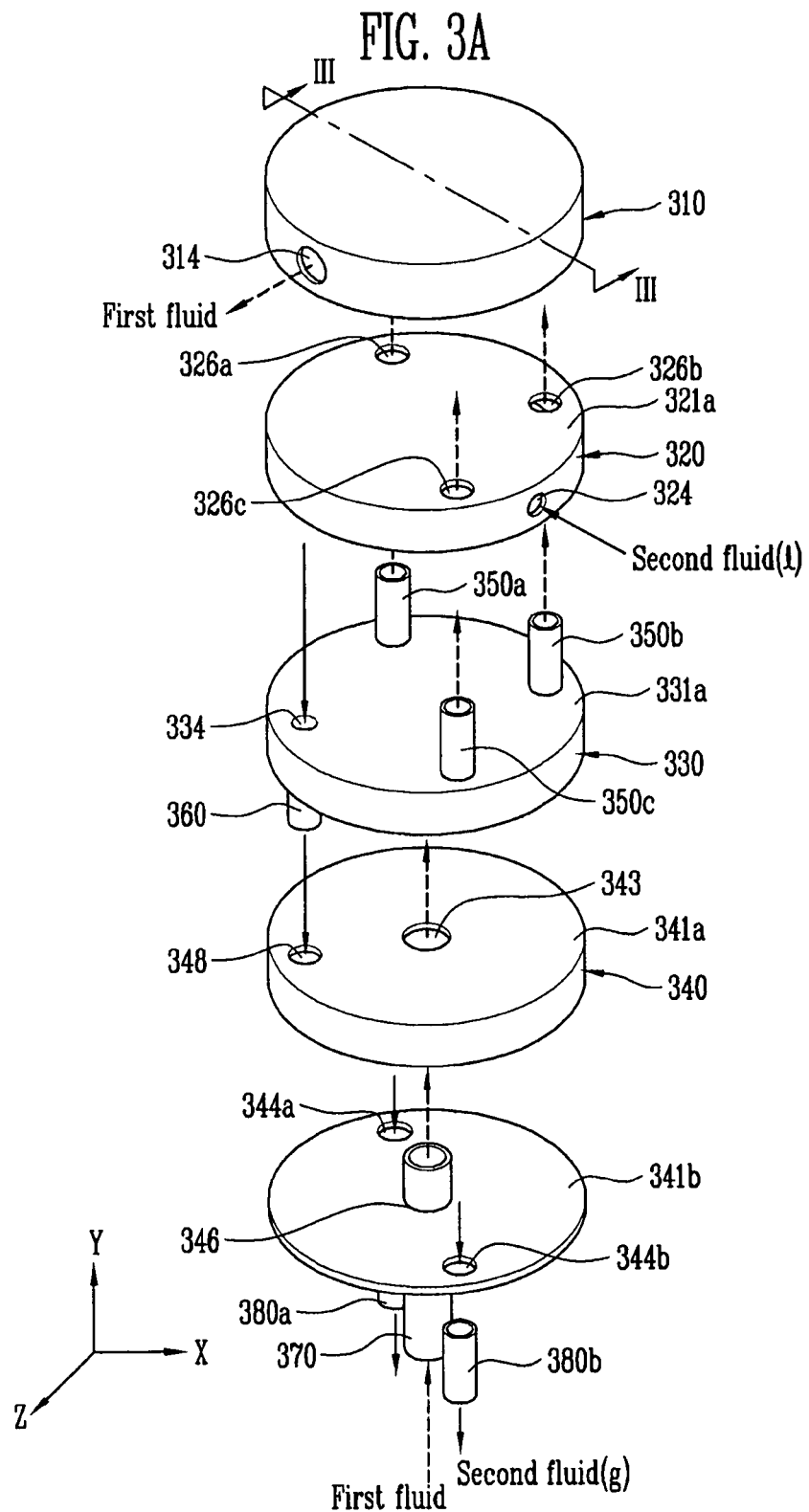

EVAPORATOR AND FUEL REFORMER HAVING THE SAME

CROSS-REFERENCE TO RELATED APPLICATIONS

This application claims priority to and the benefit of U.S. Provisional Patent Application No. 61/094,802, filed on Sep. 5, 2008, the entire content of which is incorporated herein by reference.

BACKGROUND

1. Field of the Invention

The present invention relates to an evaporator and a fuel reformer including the same.

2. Discussion of Related Art

A fuel reformer is an apparatus which reforms fuel and generates hydrogen rich gas. This fuel reformer can be used with a fuel cell (which is a clean power generating apparatus that can directly generate electric energy by an electrochemical reaction of hydrogen and oxygen), etc.

The fuel reformer generally includes a heat source and a reforming reactor. The heat source supplies necessary heat to the reforming reactor, and the reforming reactor reforms fuel and generates hydrogen rich gas. The reforming reactor can generate the hydrogen rich gas using a steam reforming scheme, an auto-thermal reforming scheme, a partial oxidation scheme, or a combination thereof.

Also, the fuel reformer can further include an evaporator to improve fuel efficiency and apparatus performance. In this case, the evaporator evaporates a liquid-phase fuel flowing into the evaporator from the outside, and supplies it (that is, a gas-phase fluid evaporated from the liquid-phase fuel) to the reforming reactor.

That is, when a liquid-phase fuel or water flows into the reforming reactor using the steam reforming scheme, the performance of the fuel reformer is significantly reduced due to an uneven reforming reaction. In order to reduce or prevent this problem, the evaporator may include a relatively long channel as compared to the volume of the fuel reformer so as to evaporate the liquid-phase fuel and/or water flowing in from the outside.

Therefore, the evaporator has a large volume due to the long channel structure. In the case that the evaporator has a small volume, the evaporator has a complicated structure due to a long multi-folded channel, such that it is difficult to manufacture. It is therefore desirable to develop a structure for an evaporator capable of being small and easy to manufacture, and providing a fuel reformer with a high-efficiency.

SUMMARY OF THE INVENTION

An aspect of an embodiment of the present invention is directed toward an evaporator capable of having a large output performance, despite having a small volume.

Another aspect of an embodiment of the present invention is directed toward a fuel reformer having the evaporator capable of having the large output performance, despite having the small volume.

An embodiment of the present invention provides an evaporator of a fuel reformer. The evaporator includes a first stage, a second stage, a first fin structure, and a second fin structure. The first stage has a first chamber, a first first opening and a first second opening. The first first opening and the first second opening are for allowing the first fluid to enter into and exit from the first chamber. The second stage is stacked together with the first stage as a stack of the stages, and has a second chamber, a second first opening and a second second opening. The second first opening and the second second opening are for allowing the second fluid to enter into and exit from the second chamber. The first fin structure is in the first chamber and for increasing a heat-exchange surface area with a flow of the first fluid within the first chamber, and the second fin structure is in the second chamber and for increasing a heat-exchange surface area with a flow of the second fluid within the second chamber.

In one embodiment of the evaporator, the first fin structure substantially contacts inner surfaces of the first chamber, and/or the second fin structure substantially contacts inner surfaces of the second chamber.

In one embodiment of the evaporator, the first fin structure is configured to form turbulence in the flow of the first fluid within the first chamber, and the second fin structure is configured to form turbulence in the flow of the second fluid within the second chamber.

In one embodiment, the evaporator further includes a third stage, a first pipe, and a third fin structure. The third stage has a third chamber, a third first opening and a third second opening. The third first opening and the third second opening are for allowing the first fluid to enter into and exit from the third chamber, the first pipe is penetrated through the second stage and for coupling the first chamber to the third chamber, and the third fin structure is in the third chamber and for increasing a heat-exchange surface area with a flow of the first fluid within the third chamber. Here, the first fin structure substantially may contact inner surfaces of the first chamber, the second fin structure may substantially contact inner surfaces of the second chamber, and the third fin structure may substantially contact inner surfaces of the third chamber. The first pipe may have a first end at the first first opening and a second end at the third second opening.

In addition, the evaporator may further include a fourth stage having a fourth chamber, a fourth first opening and a fourth second opening, the fourth first opening and the fourth second opening for allowing the second fluid to enter into and exit from the fourth chamber; a second pipe penetrating through the third stage and for coupling the second chamber to the fourth chamber; and a fourth fin structure in the fourth chamber and for increasing a heat-exchange surface area with a flow of the second fluid within the fourth chamber. Here, the first fin structure may substantially contact inner surfaces of the first chamber, the second fin structure may substantially contact inner surfaces of the second chamber, the third fin structure may substantially contact inner surfaces of the third chamber, and the fourth fin structure may substantially contact inner surfaces of the fourth chamber. The first pipe may have a first end at the first first opening and a second end at the third second opening, and the second pipe may have a first end at the second second opening and a second end at the fourth first opening. The first fluid may include exhaust gas from a heat source, and the second fluid may include at least one of fuel or water. Each of the first, second, third and fourth fin structures may include a plurality of first fins in a first wave pattern having a first wavelength period and extending in a first direction; and a plurality of second fins in a second wave pattern substantially identical to the first wave pattern and extending alternatively and crisscross between adjacent ones of the first fins by a second wavelength period offset from the first wavelength period by a half wavelength period. Each of the first, second, third and fourth fin structures may be metallic. The fourth fin structure and the second fin structure may be configured to change the second fluid from a liquid-phase into a gas-phase by heat energy transferred from the third fin structure and the first fin structure to the fourth fin structure and the second fin structure.

Another embodiment of the present invention provides an evaporator of a fuel reformer. The evaporator includes a first stage, a first fin structure, a second stage, a second fin structure, a third stage, a third fin structure, a first pipe, a fourth stage, a fourth fin structure, and a second pipe. The first stage has a first inlet for allowing a first fluid to enter into the first stage and a first outlet for allowing the first fluid to exit from the first stage. The first fin structure is in the first stage. The second stage has a second inlet for allowing a second fluid to enter into the second stage and a second outlet for allowing the second fluid to exit from the second stage. The second fin structure is in the second stage. The third stage has a third inlet for allowing the first fluid to enter into the third stage and a third outlet for allowing the first fluid to exit from the third stage, the second stage being between the first stage and the third stage. The third fin structure is in the third stage. The first pipe is penetrated through the second stage and for coupling the first stage to the third stage. The fourth stage has a fourth inlet for allowing the second fluid to enter into the fourth stage and a fourth outlet for allowing the second fluid to exit from the fourth stage. The fourth fin structure is in the fourth stage, and the second pipe is penetrated through the third stage and for coupling the second stage to the fourth stage.

In one embodiment of the evaporator, the first fin structure substantially contacts inner surfaces of the first stage, the second fin structure substantially contacts inner surfaces of the second stage, the third fin structure substantially contacts inner surfaces of the third stage, and the fourth fin structure substantially contacts inner surfaces of the fourth stage.

In one embodiment of the evaporator, the first stage, the second stage, the third stage, and the fourth stage are stacked together as a stack of the stages.

In one embodiment, the evaporator is a four-stage evaporator.

In one embodiment of the evaporator, the second fin structure has a first through-hole penetrated by the first pipe, the third fin structure has a second through-hole penetrated by the second pipe, and the fourth fin structure has a third through-hole penetrated by a third pipe for supplying the first fluid from a heat source to the third stage.

In one embodiment, the evaporator further includes a third pipe for supplying the first fluid from a heat source to the third stage, and a fourth pipe for supplying the second fluid in gas-phase to a reforming reactor. Here, the first pipe may have a first end at the first inlet and a second end at the third outlet, the second pipe may have a first end at the second outlet and a second end at the fourth inlet, the third pipe may have a first end at the third inlet and a second end at the heat source, and the fourth pipe may a first end at the fourth outlet and a second end at the reforming reactor.

In addition, the evaporator may have a plurality of first pipes, and/or a plurality of fourth pipes. The second fin structure may have a plurality of through-holes respectively penetrated by the plurality of first pipes, the third fin structure may have a second through-hole penetrated by the second pipe, and the fourth fin structure may have a third through-hole penetrated by a third pipe for supplying the first fluid from a heat source to the third stage.

In one embodiment of the evaporator, the first fluid includes exhaust gas from a heat source, and the second fluid includes at least one of fuel or water.

In one embodiment of the evaporator, each of the first, second, third and fourth fin structures includes a plurality of first fins in a first wave pattern having a first wavelength period and extending in a first direction, and a plurality of second fins in a second wave pattern identical to the first wave pattern and extending alternatively and crisscross between adjacent ones of the first fins by a second wavelength period offset from the first wavelength period by a half wavelength period.

In one embodiment of the evaporator, each of the first, second, third and fourth fin structures is metallic.

In one embodiment of the evaporator, the fourth fin structure and the second fin structure are configured to change the second fluid from a liquid-phase into a gas-phase by heat energy transferred from the third fin structure and the first fin structure to the fourth fin structure and the second fin structure.

Another embodiment of the present invention provides a fuel reformer. The fuel reformer includes a reforming reactor, an evaporator, and a heat source. The evaporator is for providing a second fluid to the reforming reactor. The heat source is for providing a first fluid to the evaporator. The evaporator includes a first stage having a first inlet for allowing the first fluid to enter into the first stage and a first outlet for allowing the first fluid to exit from the first stage; a first fin structure in the first stage; a second stage stacked together with the first stage as a stack of the stages and having a second inlet for allowing the second fluid to enter into the second stage and a second outlet for allowing the second fluid to exit from the second stage; and a second fin structure in the second stage.

In one embodiment of the reformer, the heat source is surrounded by the reforming reactor and is configured to supply heat to the reforming reactor, the first fluid includes exhaust gas from the heat source, and the second fluid includes at least one of fuel or water.

In one embodiment, the reformer further includes a first pipe having a first end at the evaporator and a second end at the heat source, and a second pipe having a first end at the evaporator and a second end at the reforming reactor.

In one embodiment, the reformer further includes a carbon monoxide remover for receiving a reformed fuel from the reforming reactor.

In one embodiment of the reformer, the evaporator further includes a third stage having a third inlet for allowing the first fluid to enter into the third stage and a third outlet for allowing the first fluid to exit from the third stage, the second stage being between the first stage and the third stage; a third fin structure in the third stage; a first pipe penetrating through the second stage and for coupling the first stage to the third stage; a fourth stage having a fourth inlet for allowing the second fluid to enter into the fourth stage, and a fourth outlet for allowing the second fluid to exit from the fourth stage; a fourth fin structure in the fourth stage; and a second pipe penetrating through the third stage for coupling the second stage to the fourth stage. Here, the fuel reformer may further include a third pipe for supplying the first fluid from the heat source to the third stage, and a fourth pipe for supplying the second fluid in gas-phase to the reforming reactor.

In one embodiment of the reformer, the first fin structure substantially contacts inner surfaces of the first stage, and the second fin structure substantially contacts inner surfaces of the second stage.

A more complete understanding the evaporator and the fuel reformer having the same will be afforded to those skilled in the art, by a consideration of the following detailed description. Reference will be made to the appended sheets of drawings, which will first be described briefly.

BRIEF DESCRIPTION OF THE DRAWINGS

The accompanying drawings, together with the specification, illustrate exemplary embodiments of the present invention, and, together with the description, serve to explain the principles of the present invention.

FIG. 3A is a schematic exploded perspective view of the evaporator of FIG. 2 from which fin structures are omitted;

DETAILED DESCRIPTION

Figure 1:
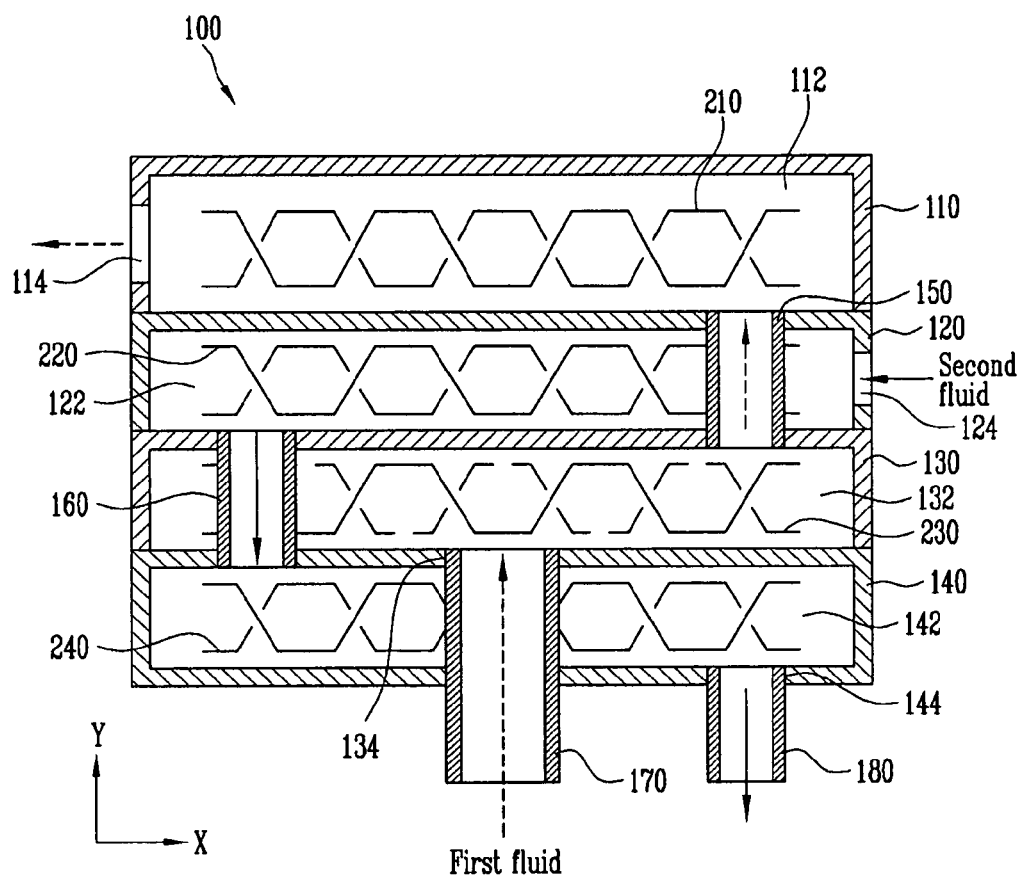
FIG. 1 is a schematic cross-sectional view of an evaporator according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

In the following description, the term, "gas-phase" refers to a state of fluid in which molecules freely move due to a distance interval and a weak bonding force therebetween so that the fluid does not have a set (or predetermined) form and volume and tends to fill a container. Gas-phase fluid has smaller density than a liquid-phase or solid-phase fluid, and can easily change its volume due to an increase or decrease of pressure. Also, the gas-phase fluid can be easily compressed or heat-expanded.

FIG. 1 is a schematic cross-sectional view of an evaporator 100 according to an embodiment of the present invention.

Referring to FIG. 1, the evaporator 100 has a four-stage disk structure in which a first disk 110, a second disk 120, a third disk 130 and a fourth disk are stacked with each other.

The first disk 110 has a first chamber 112, a first hole 114 to communicate fluids through, and a first fin structure 210 filling the first chamber 112. The second disk 120 has a second chamber 122, a second hole 124 to communicate fluids through, and a second fin structure 220 filling the second chamber 122. The third disk 130 has a third chamber 132, a third hole 134 to communicate fluids through, and a third fin structure 230 filling the third chamber 132. The fourth disk 140 has a fourth chamber 142, a fourth hole 144 to communicate fluids through, and a fourth fin structure 240 filling the fourth chamber 142.

The third chamber 132 communicates with the first chamber 112 through a first pipe 150 such that fluids can flow between the third chamber 132 and the first chamber 112. The second chamber 122 communicates with the fourth chamber 142 through a second pipe 160 such that fluids can flow between the second chamber 122 and the fourth chamber 142. The third disk 130 and the first disk 110 respectively have another holes coupled to the two ends of the first pipe 150. The second disk 120 and the fourth disk 140 respectively have another holes coupled to the two ends of the second pipe 160.

A third pipe 170 may be coupled to the third hole 134 of the third disk 130. A fourth pipe 180 may be coupled to the fourth hole 144 of the fourth disk 140.

In the present embodiment, the first pipe 150 is provided to penetrate through the second disk 120, the second pipe 160 is provided to penetrate through the third disk 130, and the third pipe 170 is provided to penetrate through the fourth disk 140. Such a penetration structure is merely an example to reduce the size of (or to miniaturize) the evaporator. For example, each pipe described above may be provided outside the evaporator, not penetrating through the disks. Furthermore, the third pipe 170 and fourth pipe 140 are installed to protrude in a gravity direction (y direction), in consideration of a reformer coupled to the evaporator 100 in the gravity direction.

Each of the first to fourth fin structures 210, 220, 230, and 240 has an increased heat exchange surface area in a flow of first fluids or second fluids. The respective fin structures may be formed of a sheet-shaped metallic member provided with a plurality of fins (or waves). That is, in one embodiment, the respective fin structures have a shape where a plurality of first fins in a first wave pattern extending in one direction, and a plurality of second fins in the same wave pattern disposed crisscross together with the wave pattern period of the first fins by a half period are alternately disposed with each other. (See FIG. 4.) That is, in one embodiment, each of the first, second, third and fourth fin structures 210, 220, 230, and 240 includes a plurality of first fins in a first wave pattern having a first wavelength period and extending in a first direction, and a plurality of second fins in a second wave pattern substantially identical to the first wave pattern and extending alternatively and crisscross between adjacent ones of the first fins by a second wavelength period offset from the first wavelength period by a half wavelength period. As such, the fluids can be evenly distributed in the respective fin structures to form turbulence, and perform a high turbulence flow. The heat exchange surface may thus increase greatly.

The respective fin structures are installed to fill the respective disks. That is, in one embodiment, at least one of the first, second, third and fourth fin structures 210, 220, 230, and 240 substantially contacts inner surfaces of its respective chamber 112, 122, 132, or 142. In one embodiment, each of the first, second, third and fourth fin structures 210, 220, 230, and 240 substantially contacts inner surfaces of its respective chamber 112, 122, 132, or 142. Therefore, the heat energy of the first fluid is efficiently transferred to the third disk 130 and first disk 110 when the first fluid having heat energy flows through the third disk 130 and first disk 110. The heat energy of the third disk 130 and first disk 110 is transferred to the second disk 120 and fourth disk 140. When the second fluid flows through the second disk 120 and fourth disk 140, the second fluid is heated or evaporated by the heat energy of the second disk 120 and fourth disk 140.

Hereinafter, a configuration of an evaporator of an embodiment of the present invention will be described in more detail with reference to an illustrative example.

Figure 2:
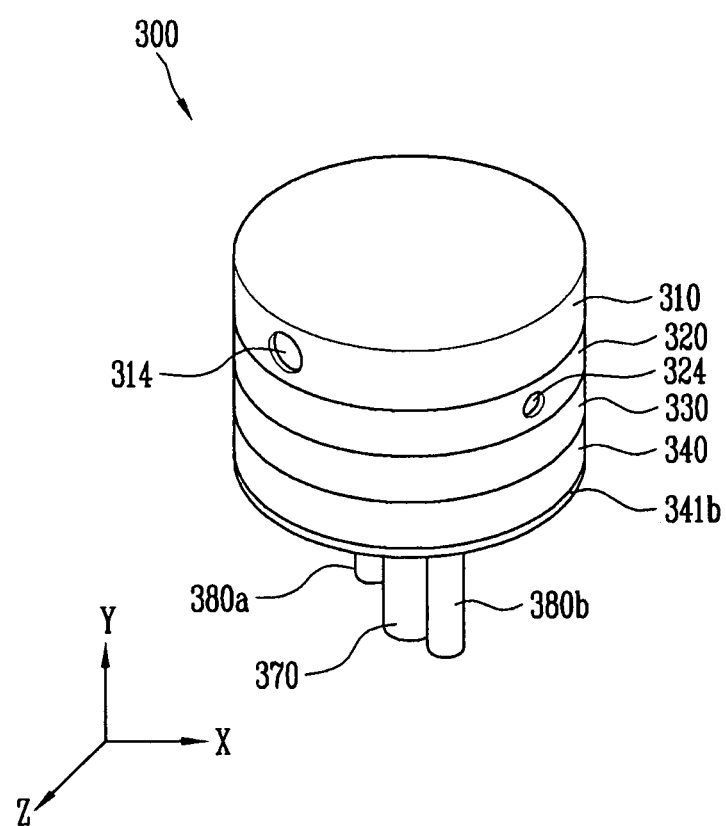
FIG. 2 is a schematic perspective view of an evaporator according to another embodiment of the present invention.
Figure 3B:
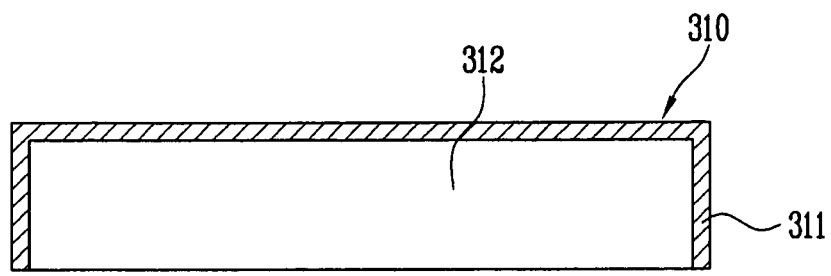
FIG. 3B is a schematic cross-sectional view of a first cover plate of FIG. 3A.

FIG. 2 is a schematic perspective view of an evaporator 300 according to another embodiment of the present invention. FIG. 3A is a schematic exploded perspective view of the evaporator 300 of FIG. 2 from which fin structures are omitted. FIG. 3B is a schematic cross-sectional view taken along the line III-III of a first cover plate of FIG. 3B.

Referring to FIGS. 2 and 3A, the evaporator 300 includes first to fourth cover plates (or stages) 310, 320, 330, and 340, an auxiliary plate 341b, three first pipes 350a, 350b, and 350c, a second pipe 360, and first to fourth fin structures. (See 410, 420, 430, and 440 of FIG. 4.)

The first cover plate 310 has a first circumferential wall 311 forming a first internal space (or chamber) 312 having a first surface that is opened (see FIG. 3B), and a first hole 314 to communicate fluids through. Here, if the first cover plate 310 is a disk (or has a substantially flat disk shape), the first surface is one of the two circular surfaces of the disk that are opposed to each other (or is one of the two circular surfaces at the top and bottom ends of the disk). The first surface of the first cover plate 310 is covered by an upper surface 321a of the second cover plate 320.

Similarly, the second cover plate 320 has a second circumferential wall forming a second internal space (or chamber) having a second surface that is opened, and a second hole 324 to communicate fluids through. The second surface of the second cover plate 320 is covered by an upper surface 331a of the third cover plate 330. The third cover plate 330 has a third circumferential wall forming a third internal space (or chamber) having a third surface that is opened, and at least one hole to communicate fluids through. The third surface of the third cover plate 330 is covered by an upper surface 341a of the fourth cover plate 340. The fourth cover plate 340 has a fourth circumferential wall forming a fourth internal space (or chamber) having a fourth surface that is opened, and at least one hole to communicate fluids through. The fourth surface of the fourth cover plate 340 is covered by the auxiliary plate 341b.

Edges of the auxiliary plate 341b and the fourth to first cover plates 340, 330, 320, and 310 may be coupled to each other by welding or the like. According to the configuration described and shown above, the evaporator 300 of the present embodiment may have a four-stage disk configuration similar to the configuration of the evaporator as shown in FIG. 1.

Three first pipes 350a, 350b, and 350c penetrate through the second cover plate 320 to couple the third internal space of the third cover plate 330 to the first internal space 312 of the first cover plate 310 such that fluids can be communicated. To this end, ends of the respective first pipes 350a, 350b, and 350c is coupled to the other three holes 326a, 326b, and 326c of the second cover plate 320, respectively. The other ends of the respective first pipes 350a, 350b, and 350c are coupled to the other three holes of the third cover plate 330, respectively. The coupling of the ends of the respective first pipes and the second cover plate 320 and/or the coupling of the other ends of the respective first pipes and the third cover plate 330 may have a screw coupling structure. In the present embodiment, the three first pipes are merely one embodiment, and the present invention is not thereby limited. For example, one, two, or four or more first pipes may be utilized.

The second pipe 360 penetrates through the third cover plate 330 to couple the second internal space of the second cover plate 320 to the fourth internal space of the fourth cover plate 340 such that fluids can be communicated. To this end, one end of the second pipe 360 is coupled to a third hole 334 of the third cover plate 330. The other end of the second pipe 360 is coupled to a fourth hole 348 of the fourth cover plate 340. In one embodiment, the coupling between one end of the second pipe and the third cover plate 330 and/or the coupling between the other end of the second pipe 360 and the fourth cover plate 340 has a screw coupling structure.

The auxiliary plate 341b includes a plurality of holes 344a, 344b, and 346. Among these holes 344a, 344b, and 346, one hole 346 may be coupled with the third pipe 370 penetrating through the fourth cover plate 340 and guiding the first fluid introduced into the third internal space of the third cover plate 330. One end of the third pipe 370 is coupled to another hole 343 of the fourth cover plate 340. The other holes 344a and 344b of the auxiliary plate 341b may be coupled with two fourth pipes 380a and 380b for guiding discharge of the second fluid, respectively. In the present embodiment, two fourth pipes are merely one embodiment, and the present invention is not thereby limited. For example, one or three or more pipes may be utilized.

In more detail, the evaporator 300 includes the first cover plate (or stage) 310, the second cover plate (or stage) 320, the third cover plate (or stage) 330, and the fourth cover plate (or stage) 340. The first stage 310 has a first inlet for allowing a first fluid to enter into the first stage and the first hole (or outlet) 314 for allowing the first fluid to exit from the first stage 310. The first fin structure (see 410 of FIG. 4) is in the chamber 312 of the first stage 310. The second stage 320 has the second hole (or inlet) 324 for allowing a second fluid to enter into the second stage 320 and a second outlet for allowing the second fluid to exit from the second stage 320. The second fin structure (see 420 of FIG. 4) is in the chamber of the second stage 320. The third stage 330 has a third inlet for allowing the first fluid to enter into the third stage 330 and a third outlet for allowing the first fluid to exit from the third stage 330, the second stage 320 being between the first stage 310 and the third stage 330. The third fin structure (see 430 of FIG. 4) is in the chamber of the third stage 330. The first pipes 350a, 350b, and 350c are penetrated through the second stage 320 and for coupling the first stage 310 to the third stage (330). The fourth stage 340 has a fourth inlet for allowing the second fluid to enter into the fourth stage and the fourth outlets (or holes) 344a and 344b for allowing the second fluid to exit from the fourth stage. The fourth fin structure (see 440 of FIG. 4) is in the chamber of the fourth stage 340, and the second pipe 360 is penetrated through the third stage 330 and for coupling the second stage 320 to the fourth stage 340.

According to the configuration described above, the first fluid is introduced into the third internal space (or third chamber) through the third pipe 370 and the hole 343 of the fourth cover plate (or fourth stage) 340, transfers heat energy to the third fin structure (see 430 of FIG.) and flows into the first internal space (or first chamber) 312 through the first pipes 326a, 326b, and 326c. Then, the first fluid transfers heat energy to the first fin structure (see 410 of FIG. 4), and is discharged to the outside through the first hole 314 of the first cover plate (or first stage) 310.

Figure 4:
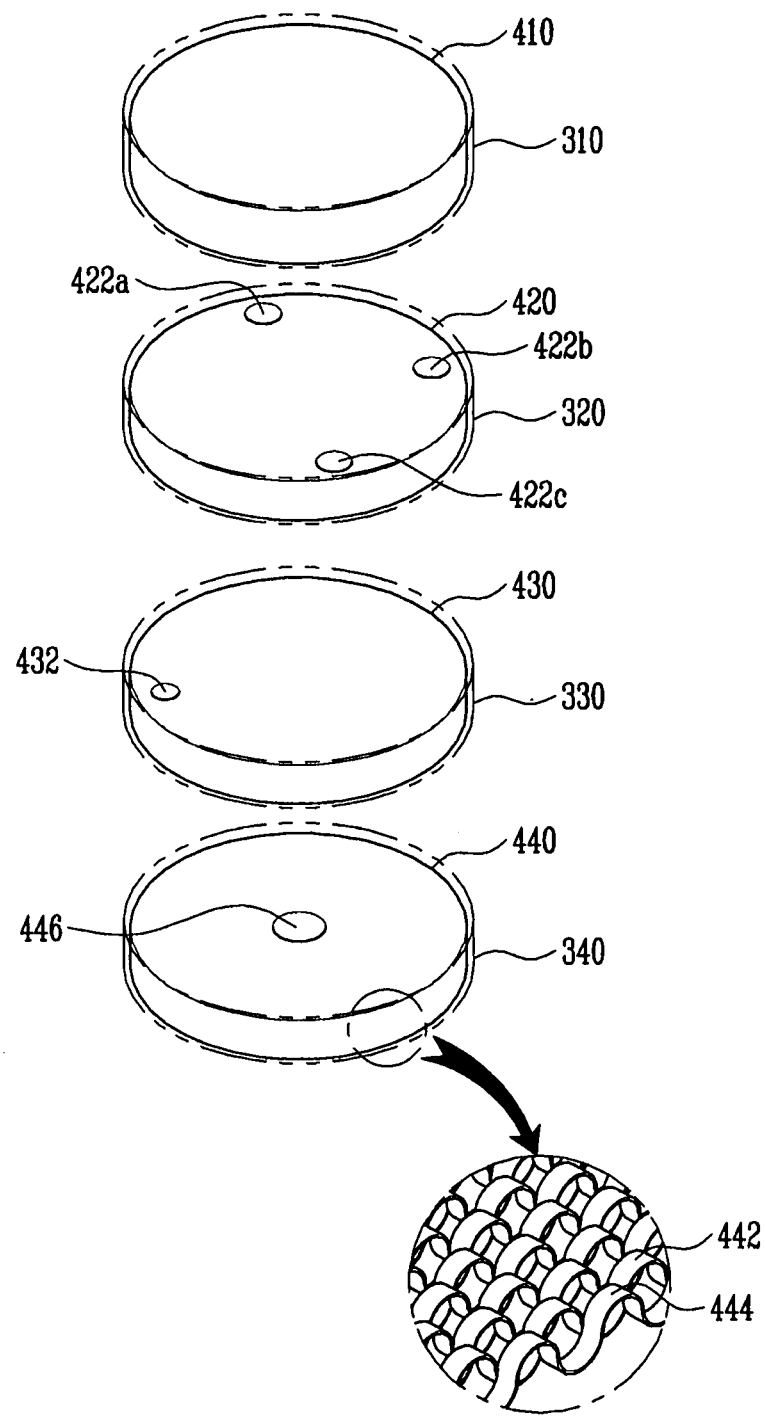
FIG. 4 is a schematic perspective view explaining fin structures provided in the evaporator of FIG. 2.

The liquid-phase second fluid is introduced into the second internal space (or second chamber) through the second hole 324 of the second cover plate (or second stage) 320, and flows into the fourth internal space (or fourth chamber) through the second pipe 360 after passing through the second fin structure (see 420 of FIG. 4). Then, via the fourth fin structure (see 440 of FIG. 4), the liquid-phase second fluid is discharged to the outside through the holes 344a and 344b of the auxiliary plate 341b and the fourth pipes 380a and 380b. Here, the liquid-phase second fluid is evaporated by heat energy transferred from the third fin structure and first fin structure to the second fin structure and fourth fin structure.

FIG. 4 is a schematic perspective view explaining fin structures provided in the evaporator of FIG. 2.

Referring to FIG. 4, first to fourth fin structures 410, 420, 430, and 440 are filed in the respective internal spaces provided in the first to fourth cover plates 310, 320, 330, and 340. Here, the filling of the first to fourth fin structures 410, 420, 430, and 440 refers to the configuration in which the fin structures are closely adhered to the respective cover plates, and fins of the respective fin structures are substantially evenly distributed in the respective internal spaces. That is, in one embodiment, the first fin structure 410 substantially contacts inner surfaces of the cover plate (or first stage) 310, the second fin structure 420 substantially contacts inner surfaces of the second cover plate (or second stage) 420, the third fin structure 330 substantially contacts inner surfaces of the third cover plate (or third stage) 430, and/or the fourth fin structure 440 substantially contacts inner surfaces of the fourth cover plate (or fourth stage) 340. The second fin structure 420 may have three holes 422a, 422b, and 422c through which three first pipes penetrate. The third fin structure 430 may have a hole 432 through which the second pipe penetrates. The fourth fin structure 440 may have a hole through which the third pipe penetrates.

The fin structures of the present embodiment have substantially the same structure. A portion of the fourth fin structure 440 is enlarged in order to more specifically explain the configuration of the fin structures.

Referring to the enlarged portion, the fourth fin structure 440 has a first fin arrangement and a second fin arrangement. The first fin arrangement has a plurality of first fins 442 extending in a first direction, and the second fin arrangement has a plurality of second fins 444 extending alternately and crisscross between the adjacent first pins by a half period in the first direction. That is, in one embodiment, the fourth fin structure 440 includes the plurality of first fins 442 in a first wave pattern having a first wavelength period and extending in the first direction, and the plurality of second fins 444 in a second wave pattern substantially identical to the first wave pattern and extending alternatively and crisscross between adjacent ones of the first fins by a second wavelength period offset from the first wavelength period by a half wavelength period. Here, the first fin 442 and second fin 444 may be made of a sheet-shape or stripe-shape member. In addition, the first fin 442 and second fin 444 may be formed of a material having high heat transfer properties. In the present embodiment, the fourth fin structure 440 may be formed not only in a single layer structure of the plurality of first fins 442 and the plurality of second fins 444, but also in a multi-layer structure where these fins are stacked in plural.

The first to third fin structures 410, 420, and 430 have substantially the same structure as the fourth fin structure 440, except for the presence/absence of holes or the position of holes. The fin structures in the present embodiment may be manufactured by pressing a single metal plate through a press process and brazing it.

According to the configuration of the evaporator described above, as an active turbulence flow of fluids passing through the respective fin structures is induced, the fluids can be evenly distributed in the respective fin structures and the internal spaces of the respective plates, and thus the heat exchange area between the respective disks is increased greatly. In other words, each of the disks has a high heat transfer coefficient. The heat exchange efficiency of the evaporator can thus be improved. Furthermore, the evaporator can be made smaller (or be miniaturized).

Figure 5:
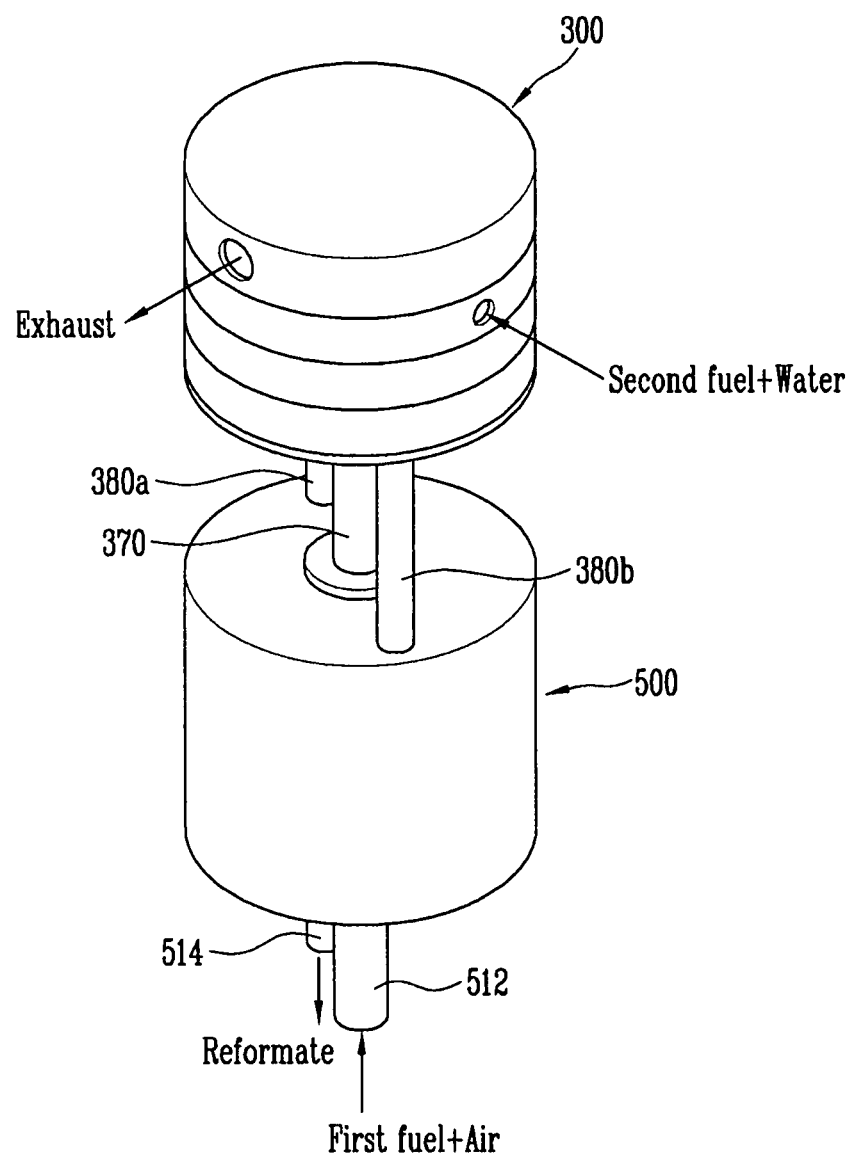
FIG. 5 is a schematic perspective view of a fuel reformer according to an embodiment of the present invention.

FIG. 5 is a schematic perspective view of a fuel reformer according to an embodiment of the present invention.

Referring to FIG. 5, the fuel reformer includes the evaporator 300 and a cylindrical body 500. The structures and functions of the evaporator 300 have already been explained above with reference to FIGS. 2 to 4, and, thus, a detailed description thereof will not be provided again.

Here, in one embodiment, the cylindrical body 500 burns a first fuel supplied through a first connection pipe 512 to generate heat, supplies a first fluid having heat energy to the evaporator 300, receives a gas-phase second fluid from the evaporator 300, generates a reformate by reforming a second fuel, and discharges the reformate through a second connection pipe 514. The first fluid may contain exhaust gas having a temperature between about 300 and about 400° C., and the second fluid may contain the second fuel and vapor.

In the present embodiment, for convenience of explanation, the second fuel is supplied to the body 50 through the evaporator 300. However, this is merely an example, and the present invention is not thereby limited. For example, the fuel reformer of the present embodiment may be implemented in a manner such that the gas-phase second fuel is not introduced into the evaporator 300 but is supplied directly to the body 500. The second fuel includes a hydrocarbon-based material such as LPG, natural gas, methanol, ethanol, or the like.

In the present embodiment, for convenience of illustration, the third pipe 370 for transferring the first fluid and the fourth pipes 380a and 380b for transferring the second fluid are illustrated to be exposed between the evaporator 300 and the body 500. However, this is merely an example, and the present invention is not thereby limited. For example, the fuel reformer of the present embodiment may be implemented such that the evaporator 300 is directly coupled to the body 500 by shortening the length of the pipes so that these pipes are not exposed.

Figure 6:
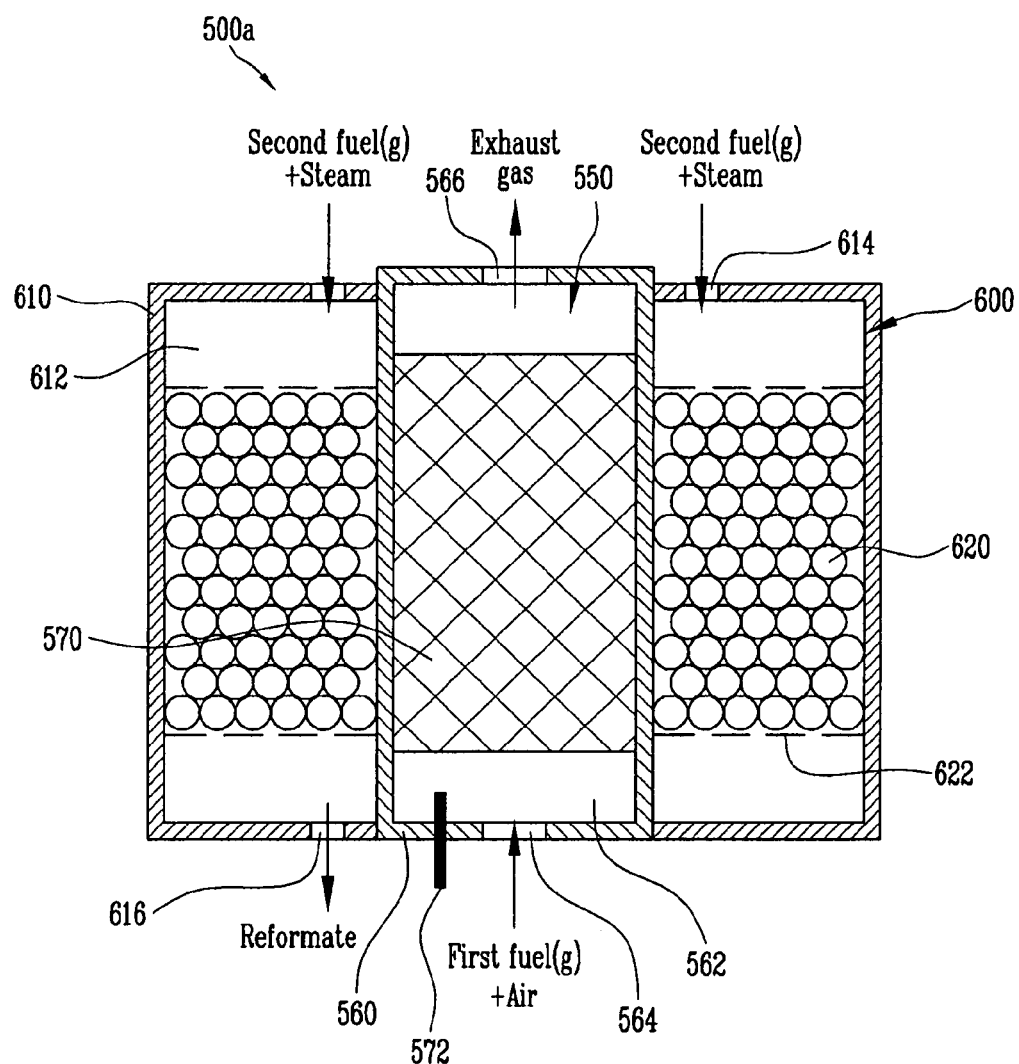
FIG. 6 is a schematic cross-sectional view illustrating a configuration which can be adopted for a body of the fuel reformer of FIG. 5.

FIG. 6 is a schematic cross-sectional view explaining a configuration which can be adopted for a body 500a of the fuel reformer of FIG. 5.

Referring to FIG. 6, the body 500a of the fuel reformer includes a heat source 550 and a reforming reactor 600. The body 550a has a dual cylindrical structure in which the heat source 550 in the form of a first cylindrical structure is surrounded by the reforming reactor 600 in the form of a second cylindrical structure.

The heat source 550 may include a first cylindrical body 560, an oxidation catalyst 570 provided in an internal space 562 of the first cylindrical body 560, and an igniter 572. A first opening part 564 is provided on one side of the first cylindrical body 560, and a second opening part 566 is provided on the other side thereof. The first fuel and air are supplied to the internal space 562 through the first opening part 564 and are oxidized on a surface of the oxidation catalyst 570. One portion of reaction heat generated at this time is supplied to the reforming reactor 600, and the other portion thereof is discharged through the second opening part 566 together with air. The igniter 572 ignites the first fuel supplied to the internal space at the time of initial operation of the heat source 550. The second opening part 566 may be coupled to one end of the third pipe 370. (See FIG. 5.)

The reforming reactor 600 includes a second cylindrical body 610 surrounding the first cylindrical body 560 on the same axis, and reforming catalysts 620 provided in an internal space 612 of the second cylindrical body 610. The reforming catalysts 620 may include granule-type catalysts. In this case, the reforming catalysts 620 may be encircled by reticular members 622 to reduce (or prevent scattering) of the catalysts. Two third opening parts 614 are provided on one side of the second cylindrical body 610, with the first opening part 564 therebetween, and the fourth opening part 616 is provided on the other side of the second cylindrical body 610.

The steam supplied from the evaporator 300 of the present embodiment and the gas-phase second fuel supplied through the evaporator 300 or another pipe are supplied to the internal space 612 through the third opening part 614, wherein the second fuel is subject to the reforming reaction by heat from the heat source 550, passing through the catalysts 620. The reformate generated by the reforming reaction is discharged through the fourth opening part 616. Here, the reforming reaction may be implemented to include reforming reaction by steam reforming, auto thermal reforming and/or partial oxidation.

Figure 7:
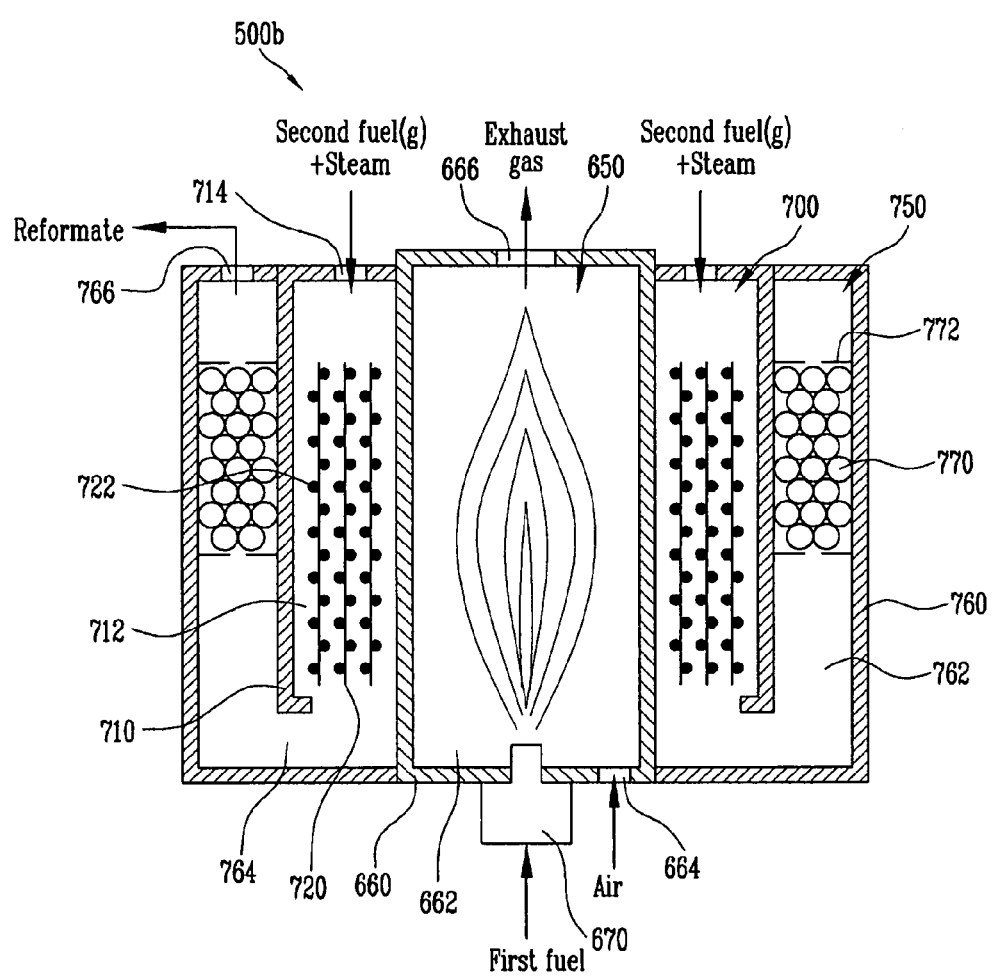
FIG. 7 is a schematic cross-sectional view illustrating another configuration which can be adopted for a body of the fuel reformer of FIG. 5.

FIG. 7 is a schematic cross-sectional view explaining another configuration which can be adopted for a body 500b of the fuel reformer of FIG. 5.

Referring to FIG. 7, the body 500b of the fuel reformer includes a heat source 650, a reforming reactor 700 and a carbon monoxide remover 750. The body 500b has a triple cylindrical structure in which the heat source 650 in the form of a first cylindrical structure is surrounded by the reforming reactor 700 in the form of a second cylindrical structure on the same axis, and the reforming reactor 700 in the form of a second cylindrical structure is surrounded by the carbon monoxide remover 750 in the form of a third cylindrical structure on the same axis.

The heat source 650 includes a first cylindrical body 660 and a burner 670 for emitting flame to an internal space 562 of the first cylindrical body 660. A first opening part 664 is provided on one side of the first cylindrical body 660, and a second opening part 666 is provided on the other side thereof. Air is supplied to the internal space 662 through the first opening part 664. A portion of heat energy generated by flames of the burner 670 is supplied to the reforming reactor 700 and the carbon monoxide remover 750, and another portion of heat energy is discharged through the second opening part 666 together with air. The second opening part 666 may be coupled to one end of a third pipe 370 (See FIG. 5).

The reforming reactor 700 includes a second cylindrical body 710 surrounding the first cylindrical body 660 on the same axis, and reforming catalysts 720 provided in an internal space 712 of the second cylindrical body 710. The reforming catalysts 720 may have a support in a honeycomb or spiral structure and catalyst layers 722 coated on the supports. Two third opening parts 714 are provided on one side of the second cylindrical body 710. The third opening parts 714 may be respectively coupled to one end of the fourth pipes 380a and 380b (See FIG. 5).

The carbon monoxide remover 750 includes a third cylindrical body 760 surrounding the first cylindrical body 660 and the second cylindrical body 710 on the same axis, and catalysts 770 provided in an internal space 762 of the third cylindrical body 760. The catalysts 770 may include shift catalysts and/or PROX catalysts. The shift catalyst removes carbon monoxide contained in the reformate through low temperature and/or high temperature water gas shift reaction. The PROX catalyst removes carbon monoxide contained in the reformate through a preferential CO oxidation reaction.

The internal space 762 of the third cylindrical body 710 is coupled to the internal space 712 of the second cylindrical body 710 through a connection passage 764 such that they can communicate fluids with each other. A fourth opening part 766 is provided on one side of the third cylindrical body 710. The reformate from which carbon monoxide is removed is discharged from the internal space 762 to the outside through the fourth opening part 766.

The steam supplied from the evaporator 300 of the present embodiment and the gas-phase second fuel supplied through the evaporator 300 or another pipe are supplied to the internal space 712 of the reforming reactor 700 through the third opening part 714, wherein the second fuel is reformed by heat from the heat source 650, while passing through the catalysts 720. Then, the reformate generated by the reforming reaction flows into the internal space 762 of the carbon monoxide remover 750 through the connection passage 764, and a portion of carbon monoxide is removed therefrom by the catalysts 770. The reformate in which a portion of carbon monoxide has been removed is discharged to the outside through the fourth opening part 766.

In the present embodiment, for convenience of explanation, the fuel reformer having a body with a cylindrical structure is described. However, this is merely an example, and the present invention is not thereby limited. For example, the fuel reformer according to an embodiment of the present invention may be implemented to have diverse kinds and forms of body that can still be utilized with the evaporators 100 and 300.

As described above, in the evaporator used in the fuel reformer of an embodiment of the present invention, exhaust gas flowing into the third and first chambers of the third and first disks and a second fluid (e.g., water) flowing into the second and fourth chambers of the second and fourth disks are evenly distributed to increase the heat exchange surface area between the exhaust gas and the fluid, making it possible to enhance the heat transfer efficiency. Also, the pulsation (or flow rate difference) of the reformate generated is maintained below about ±0.2 L/min by the more efficient evaporation of the second fluid. Such value is considerably small as compared with about ±0.65 L/min of a prior fuel reformer, indicating that a more even flow rate of the reformate can be generated in the fuel reformer.

With an embodiment of the present invention, the output can be improved, while reducing the volume of an evaporator. In particular, a plurality of disks for performing the heat exchange with each other are crossed, and fin structures are installed in the respective disks, and thus an area (surface area) contacting fluids within the respective disks can increase without increasing back pressure, thereby making it possible to enhance the heat exchange efficiency, to increase the vaporization amount of fluid, and/or to vaporize fluid in a uniform manner. Also, the evaporator has a simple structure, so it can be manufactured with ease and can be mass produced. Furthermore, the pulsation of the reforming reaction in the fuel reformer having the evaporator is maintained to be low, thereby making it possible to enhance the performance stability and reliability of the reformer. Also, the fuel reformer having the evaporator can be made small (or be miniaturized), and the warm-up time of the fuel reformer can be shortened.

To put it another way, a conventional evaporator has a large volume with multiple stages (e.g., eight stages) to evaporate a liquid-phase fluid into a gas-phase fluid. However, the large evaporator increases the overall size of the reformer and the time required to warm-up the evaporator.

By contrast, in view of the foregoing, an embodiment of the present invention provides an evaporator having an internal fin structure to increase a heat-exchange surface area of the evaporator with a flow of fluid passing through the internal fin structure. In one embodiment, the evaporator is a four-stage evaporator having first, second, third, and fourth stages, in which each of the stages contains a fin structure. The fourth and second stages are coupled to each other by a second pipe penetrating through the third stage, and the third and first stages are coupled to each other by a first pipe penetrating through the second stage. The fin structures of the fourth and second stages are configured to evaporate a fuel and water from a liquid-phase into a gas-phase by heat energy transferred from the fins of the first and third stages. Here, the heat energy of the first and third stages is derived from an exhaust gas from a heater, the exhaust gas passing through the fin structures of the first and third stages. As such, the fin structures of the first, second, third, and fourth stages increase the heat exchange surface area between the exhaust gas and the fuel and water to enhance heat transfer efficiency, while not increasing the overall size of the evaporator.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An evaporator of a fuel reformer comprising:
a first stage having a first chamber, a first first opening and a first second opening, the first first opening and the first second opening for allowing a first fluid to enter into and exit from the first chamber;
a second stage stacked together with the first stage as a stack of the stages, the second stage having a second chamber, a second first opening and a second second opening, the second first opening and the second second opening for allowing a second fluid to enter into and exit from the second chamber;
a first fin structure in the first chamber and for increasing a heat-exchange surface area with a flow of the first fluid within the first chamber; and
a second fin structure in the second chamber and for increasing a heat-exchange surface area with a flow of the second fluid within the second chamber,
wherein each of the first and the second fin structures comprises:
a plurality of first fins each extending along a first direction in a first wave pattern having a first period; and
a plurality of corresponding second fins each extending along the first direction in a second wave pattern having the first period and being offset from the first wave pattern by one half of the first period, the second fins being arranged alternately with the corresponding first fins,
wherein the first fin structure substantially contacts inner surfaces of the first chamber,
wherein the second fin structure substantially contacts inner surfaces of the second chamber.

2. The evaporator of claim 1, wherein:
the first fin structure is configured to form turbulence in the flow of the first fluid within the first chamber, and
the second fin structure is configured to form turbulence in the flow of the second fluid within the second chamber.

3. The evaporator of claim 1, further comprising:
a third stage having a third chamber, a third first opening and a third second opening, the third first opening and the third second opening for allowing the first fluid to enter into and exit from the third chamber;
a first pipe penetrating through the second stage and for coupling the first chamber to the third chamber; and
a third fin structure in the third chamber and for increasing a heat-exchange surface area with a flow of the first fluid within the third chamber.

4. The evaporator of claim 3, wherein:
the first fin structure substantially contacts inner surfaces of the first chamber,
the second fin structure substantially contacts inner surfaces of the second chamber, and
the third fin structure substantially contacts inner surfaces of the third chamber.

5. The evaporator of claim 3, wherein the first pipe has a first end at the first first opening and a second end at the third second opening.

6. The evaporator of claim 3, further comprising a fourth stage having a fourth chamber, a fourth first opening and a fourth second opening, the fourth first opening and the fourth second opening for allowing the second fluid to enter into and exit from the fourth chamber;
a second pipe penetrating through the third stage and for coupling the second chamber to the fourth chamber; and
a fourth fin structure in the fourth chamber and for increasing a heat-exchange surface area with a flow of the second fluid within the fourth chamber.

7. The evaporator of claim 6, wherein:
the first fin structure substantially contacts inner surfaces of the first chamber,
the second fin structure substantially contacts inner surfaces of the second chamber,
the third fin structure substantially contacts inner surfaces of the third chamber, and
the fourth fin structure substantially contacts inner surfaces of the fourth chamber.

8. The evaporator of claim 6, wherein:
the first pipe has a first end at the first first opening and a second end at the third second opening, and
the second pipe has a first end at the second second opening and a second end at the fourth first opening.

9. The evaporator of claim 8, wherein:
the first fluid comprises exhaust gas from a heat source, and
the second fluid comprises at least one of fuel or water.

10. The evaporator of claim 6, wherein each of the third and fourth fin structures comprises:
corresponding first fins each extending along the first direction in the first wave pattern having the first period; and
corresponding second fins each extending along the first direction in the second wave pattern having the first period and being offset from the first wave pattern by one half of the first period, the second fins being arranged alternately with the corresponding first fins.

11. The evaporator of claim 10, wherein the first, second, third, and fourth fin structures are substantially evenly distributed in respective internal spaces of the first, second, third, and fourth chambers.

12. The evaporator of claim 6, wherein each of the first, second, third and fourth fin structures comprises metallic sheets each having alternating peaks and valleys arranged in the first wave pattern or the second wave pattern.

13. The evaporator of claim 6, wherein the fourth fin structure and the second fin structure are configured to change the second fluid from a liquid-phase into a gas-phase by heat energy transferred from the third fin structure and the first fin structure to the fourth fin structure and the second fin structure.

14. The evaporator of claim 6,
further comprising an auxiliary plate,
wherein the first stage comprises:
a first peripheral wall; and
a first cover plate coupled to a top surface of the first peripheral wall,
wherein the second stage comprises:
a second peripheral wall; and
a second cover plate coupled to a top surface of the second peripheral wall,
wherein the third stage comprises:
a third peripheral wall; and
a third cover plate coupled to a top surface of the third peripheral wall,
wherein the fourth stage comprises a fourth peripheral wall; and a fourth cover plate coupled to a top surface of the fourth peripheral wall, and wherein the fourth stage is stacked on the auxiliary plate to form the fourth chamber, the third stage is stacked on the fourth stage to form the third chamber, the second stage is stacked on the third stage to from the second chamber, and the first stage is stacked on the second stage to from the first chamber.

15. The evaporator of claim 14,
wherein the first, second, third, fourth, and auxiliary cover plates have a substantially flat disk shape, and
wherein the first, second, third, and fourth stages stack together in a substantially cylindrical shape.

16. An evaporator of a fuel reformer comprising:
a first stage having a first inlet for allowing a first fluid to enter into the first stage and a first outlet for allowing the first fluid to exit from the first stage;
a first fan structure in the first stage;
a second stage having a second inlet for allowing a second fluid to enter into the second stage and a second outlet for allowing the second fluid to exit from the second stage;
a second fin structure in the second stage;
a third stage having a third inlet for allowing the first fluid to enter into the third stage and a third outlet for allowing the first fluid to exit from the third stage, the second stage being between the first stage and the third stage;
a third fin structure in the third stage;
a first pipe penetrating through the second stage and for coupling the first stage to the third stage;
a fourth stage having a fourth inlet for allowing the second fluid to enter into the fourth stage and a fourth outlet for allowing the second fluid to exit from the fourth stage,
a fourth fin structure in the fourth stage; and
a second pipe penetrating through the third stage and for coupling the second stage to the fourth stage,
wherein each of the first, second, third and fourth fin structures comprises:
a plurality of first fins each extending along a first direction in a first wave pattern having a first period; and
a plurality of corresponding second fins each extending along the first direction in a second wave pattern having the first period and being offset from the first wave pattern by one half of the first period, the second fins being arranged alternately with the corresponding first fins,
wherein the first fin structure substantially contacts inner surfaces of the first stage,
wherein the second fin structure substantially contacts inner surfaces of the second stage,
wherein the third fin structure substantially contacts inner surfaces of the third stage,
wherein the fourth fin structure substantially contacts inner surfaces of the fourth stage.

17. The evaporator of claim 16, wherein the first stage, the second stage, the third stage, and the fourth stage are stacked together as a stack of the stages.

18. The evaporator of claim 16, wherein the evaporator comprises a four-stage evaporator.

19. The evaporator of claim 16, wherein:
the second fin structure has a first through-hole penetrated by the first pipe;
the third fin structure has a second through-hole penetrated by the second pipe; and
the fourth fin structure has a third through-hole penetrated by a third pipe for supplying the first fluid from a heat source to the third stage.

20. The evaporator of claim 16, further comprising:
a third pipe for supplying the first fluid from a heat source to the third stage; and
a fourth pipe for supplying the second fluid in gas-phase to a reforming reactor.

21. The evaporator of claim 20, wherein:
the first pipe has a first end at the first inlet and a second end at the third outlet,
the second pipe has a first end at the second outlet and a second end at the fourth inlet,
the third pipe has a first end at the third inlet and a second end at the heat source, and
the fourth pipe has a first end at the fourth outlet and a second end at the reforming reactor.

22. The evaporator of claim 21, wherein the first pipe comprises a plurality of first pipes.

23. The evaporator of claim 22, wherein the fourth pipe comprises a plurality of fourth pipes.

24. The evaporator of claim 23, wherein:
the second fin structure has a plurality of through-holes respectively penetrated by the plurality of first pipes;
the third fin structure has a second through-hole penetrated by the second pipe; and
the fourth fin structure has a third through-hole penetrated by a third pipe for supplying the first fluid from a heat source to the third stage.

25. The evaporator of claim 16, wherein:
the first fluid comprises exhaust gas from a heat source, and
the second fluid comprises at least one of fuel or water.

26. The evaporator of claim 16, wherein each of the first, second, third and fourth fin structures comprises metallic sheets each having alternating peaks and valleys arranged in the first wave pattern or the second wave pattern.

27. The evaporator of claim 16, wherein the fourth fin structure and the second fin structure are configured to change the second fluid from a liquid-phase into a gas-phase by heat energy transferred from the third fin structure and the first fin structure to the fourth fin structure and the second fin structure.

* * * * *

UNITED STATES PATENT AND TRADEMARK OFFICE
CERTIFICATE OF CORRECTION

PATENT NO. : 8,568,495 B2  
APPLICATION NO. : 12/420784  
DATED : October 29, 2013  
INVENTOR(S) : In-Hyuk Son Page 1 of 1

It is certified that error appears in the above-identified patent and that said Letters Patent is hereby corrected as shown below:

In the Claims

Col. 15, Claim 14, line 6      Delete "to from the second",  
                                           Insert --to form the second--

Col. 15, Claim 14, line 7      Delete "stage to from",  
                                           Insert --stage to form--

Col. 15, Claim 16, line 18      Delete "fan",  
                                           Insert --fin--

Signed and Sealed this  
Thirtieth Day of December, 2014

Michelle K. Lee  
*Deputy Director of the United States Patent and Trademark Office*